(12) United States Patent
Langlais et al.

(10) Patent No.: US 9,297,401 B2
(45) Date of Patent: Mar. 29, 2016

(54) QUICK-RELEASE FASTENER

(71) Applicant: LISI AEROSPACE, Paris Cedex (FR)

(72) Inventors: Sebastien Langlais, Tournefeuille (FR);
Vincent Defrance, Bourges (FR);
Bastien Bellavia, Mereau (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 14/517,788

(22) Filed: Oct. 17, 2014

(65) Prior Publication Data
US 2015/0110575 A1   Apr. 23, 2015

(30) Foreign Application Priority Data

Oct. 18, 2013 (FR) .................................. 13 60154

(51) Int. Cl.
*F16B 21/00*  (2006.01)
*F16B 21/16*  (2006.01)

(52) U.S. Cl.
CPC .................................... *F16B 21/165* (2013.01)

(58) Field of Classification Search
CPC .............. F16B 2/16; F16B 21/02; F16B 2/04; F16B 2/073; F16B 2/165; F16B 21/00
USPC ................................................. 411/348, 552
See application file for complete search history.

(56) References Cited

U.S. PATENT DOCUMENTS

| | | | |
|---|---|---|---|
| 2,405,400 A * | 8/1946 | Butterfield | 411/348 |
| 2,779,228 A | 1/1957 | Meepos et al. | |
| 2,786,383 A | 3/1957 | Bachman | |
| 2,816,471 A | 12/1957 | Bachman | |
| 2,898,797 A | 8/1959 | Bronstein | |
| 2,901,804 A | 9/1959 | Williams | |
| 2,968,205 A | 1/1961 | Springate | |
| 3,046,827 A * | 7/1962 | Myers | 411/348 |
| 3,068,737 A * | 12/1962 | Mewse | 411/348 |
| 3,170,362 A * | 2/1965 | Mewse | 411/348 |
| 3,192,820 A * | 7/1965 | Pitzer | 411/33 |
| 3,445,082 A | 5/1969 | Proctor et al. | |
| 3,861,476 A * | 1/1975 | Borsum | 173/169 |

FOREIGN PATENT DOCUMENTS

EP        0379282 A2    7/1990

OTHER PUBLICATIONS

Poll, Andreas, French Search Report and Written Opinion for FR 1360154, Jun. 18, 2014, 6 pages.
Poll, Andreas, European Examination Report in EP14 18 8956, Feb. 19, 2015, European Patent Office.

* cited by examiner

*Primary Examiner* — Roberta Delisle
(74) *Attorney, Agent, or Firm* — Henricks, Slavin & Holmes, LLP

(57) ABSTRACT

The invention relates to a quick-release fastener (100) of the ball-pin type, consisting of a tubular body (102) provided with a radial opening (108), an enlarged head (104), a rod (112) that can move axially within the body and through the head, a ball (110) capable of moving radially between a released position in which it rests in a reduced cross-section (132) of the rod (112) inside the body and a locked position in which it protrudes radially beyond the body through the radial opening (108), and a lever (114) that pivots about a pin (118), which lever includes at least one cam surface (142) that is in contact with the head. The rotational actuation of the lever draws the rod toward the head and causes the ball to move into the released position.

9 Claims, 2 Drawing Sheets

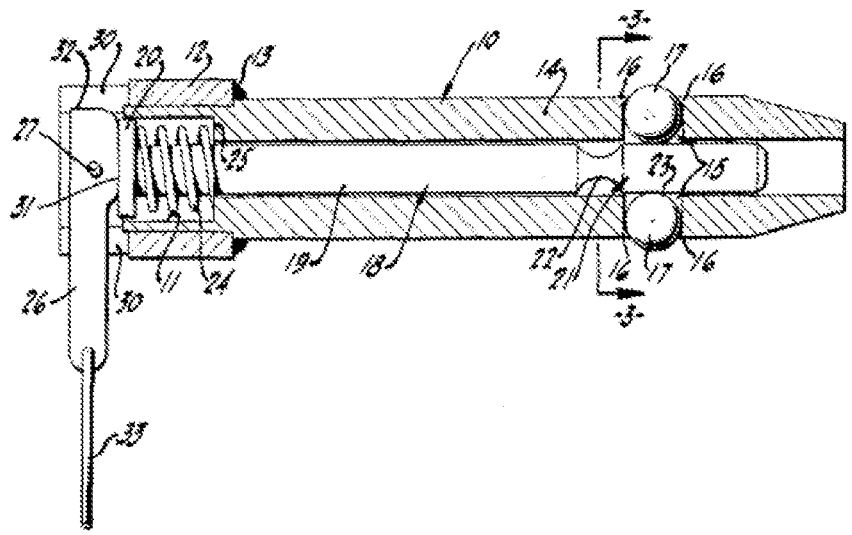
FIG. 1 – PRIOR ART
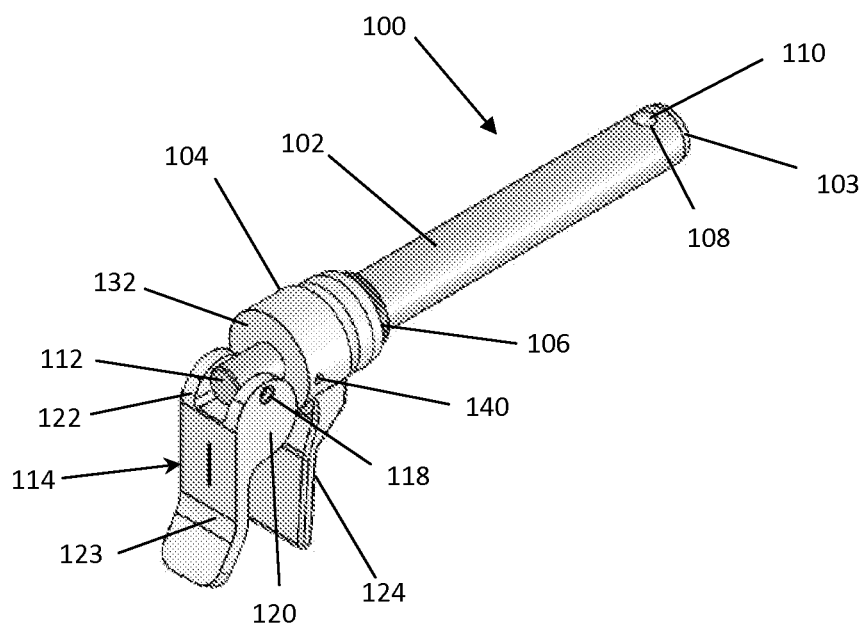
FIG. 2

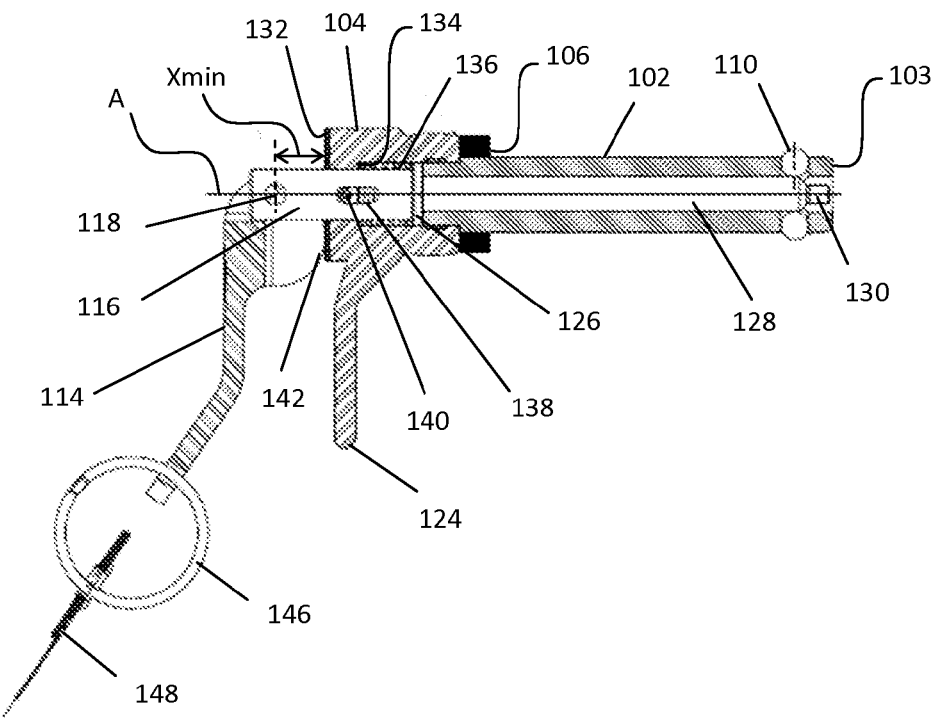
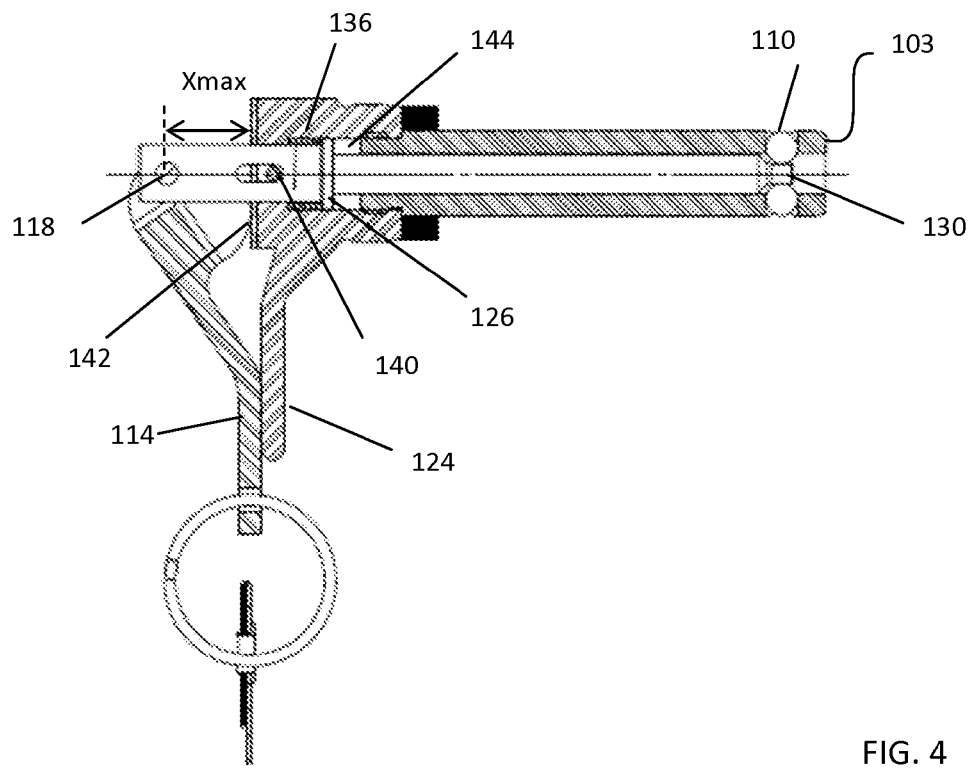
FIG. 3
FIG. 4

QUICK-RELEASE FASTENER

The present invention relates to a quick-release fastener currently used in the aircraft industry and known as a ball pin.

A ball pin usually consists of a tubular body that includes at least one radial opening; a head that forms a bearing surface against an accessible surface of the structure into which the body is inserted; a rod that can move axially within the body; a ball that is located within the body and that, depending on the position of the rod, is pushed toward the outside of the radial opening in a locking position, so as to rest against a surface of the structure opposite the accessible surface; and a mechanism for actuating the rod, which mechanism is in the form of a button or a lever. This type of fastener can be released by actuating the mechanism and by pulling a ring or a lever that is provided on the head of the fastener.

Document U.S. Pat. No. 2,786,383 discloses a ball pin of the above-mentioned type, as shown in FIG. 1. It includes a tubular member 10 and a head 12, and one or more radial openings 15 on the shank 14 of the tubular member 10 within which a ball 17 is placed. Each ball is capable of moving radially in a bore between a locked position, in which part of the ball protrudes toward the outside of the shank 14, and a released position in which the ball is entirely contained within the body without extending beyond the shank. Means 18, in the form of a rod 19, allow the balls to be moved selectively from one position to the other. The rod 19 is cylindrical. The said rod includes, near one end, a section having a reduced diameter, which section is capable of receiving the balls in the released position. The rod 19 includes, at its opposite end, an enlarged head 20, whose dimensions are such that the head 20 of the rod cannot slide inside the tubular member 10. A lever 26 pivoting about a pin 27 secured to the head 12 of the fastener has a cam surface 31, 32 that rests against the enlarged head 20. Depending on the position of the lever about the pin 27, the cam surface 31, 32 applies more or less pressure to the enlarged head 20 of the rod, which then pushes the rod into the tubular member 10 in order to release the pin, or else draws the rod toward the head 12 of the fastener in order to lock the pin.

In the released position, the lever 26 extends parallel to the rod 19. The handling of such a fastener is tricky, because the body must first be inserted and then released before the lever is grasped, even if the fastener has not been locked. Furthermore, the portion of the body between the radial openings and the free end is very long, which may pose a space problem if the free area behind the structure is limited.

The goal of the invention is to solve the problems of the fasteners according to the prior art and, in particular, to allow easy handling of the fastener, which can be used even in a structure that has little surrounding free space.

For this purpose, the invention provides a quick-release fastener that includes a tubular body having an axis of revolution, a portion of which includes at least one radial opening; an enlarged head; a rod that can move axially within the body and through the head, which rod includes at least one portion having a reduced cross-section; at least one ball capable of moving radially between a released position in which it rests in the reduced cross-section of the rod inside the body and a locked position in which it protrudes radially beyond the body through the radial opening; and a lever that pivots about a pin that is an integral part of the rod and of the lever, which lever includes at least one cam surface that is in contact with the head, such that the rotation of the lever draws the rod toward the head and moves the ball into the released position.

The kinematics, which are reversed in comparison with those of known fasteners, make it possible to obtain a fastener that has a very modest space requirement at the free end.

The fastener according to the invention preferably also displays at least one of the following characteristics:
- The fastener includes a handle located on the head;
- The rod includes anti-rotation means that block the rotation of the lever in relation to the head;
- The anti-rotation means consist of an oblong slot formed in the rod and a transverse pin that passes through both the head and the slot.
- The lever is in contact with the handle in the released position;
- The head includes a bearing surface intended to come into contact with a structure, and a rear surface located opposite the bearing surface, with the head being bored longitudinally from the bearing surface to the rear surface;
- The cam surface rests against the rear surface of the head; and
- A compression spring is housed in the bore of the head.

Other goals, characteristics, and advantages of the invention will become clear from a reading of the following description of the embodiments of the invention, which description is provided in conjunction with the drawings, on which:

FIG. 1 is a cross-sectional view of a quick-release fastener according to the prior art, as described hereinabove;

FIG. 2 is an isometric view of the quick-release fastener according to a preferred embodiment of the invention, in the locked position;

FIG. 3 is a cross-sectional view of the quick-release fastener according to a preferred embodiment of the invention, in the locked position; and FIG. 4 is a cross-sectional view of the quick-release fastener according to a preferred embodiment of the invention, in the released position.

To facilitate the reading of the drawings, only the elements that are necessary for an understanding of the invention are shown. The same elements are designated by the same reference numbers in the various drawings.

As shown in FIG. 2 and FIG. 3, the quick-release fastener 100 referred to as a "ball pin" in the following description includes a tubular body 102 that has an axis of revolution (A) and that extends longitudinally along the said axis (A). At one terminal end 103, the body 102 includes two radial openings 108, only one of which is visible in this figure. Naturally, the number of openings may vary, and the body may include one, two, three, or four radial openings. In the locked position, a ball 110 extends beyond the body 102 through the radial opening 108, and outside the structure to be assembled. The other end of the body 102 is inserted into a head 104 that has a larger cross-section. The head 104 includes a bearing surface 106 that is capable of coming into contact with the surface of the structure in which the bore is formed, inside which the body 102 is intended to be inserted.

The ball pin 100 includes a rod 112 that passes through the head 104 and extends inside the body 102 along an axis coinciding with the axis of revolution (A). A lever 114 is connected to a first end 116 of the rod extending from the head 104, by means of a transverse pin 118, which passes through two parallel walls 120, 122 of the lever and through the end 116 of the rod. The lever is mounted in such a way that it can pivot about the pin 118, so that it can be actuated manually by means of a handling area 123. The pin 118 extends in a plane that includes the axis of revolution (A).

The ball pin 100 also includes a handle 124, which in this example forms an integral part of the head 104. As a variant, the handle 124 may be a related element that is immovably fixed to the head. The handle 124 extends essentially perpendicular to the body 102 and has an ergonomic shape that makes it easier to grasp by hand. The main plane of the handle is set apart from the plane that passes through the bearing surface 106, so that an operator can place his fingers in the space formed between the handle and a surface of the structure in which the pin 100 is installed.

As shown in detail in FIG. 3, the rod then includes a first end 116, which is connected to the lever 114; an enlarged portion 126; a cylindrical portion 128 whose diameter is smaller than the said large portion 126 and that is capable of sliding inside the body 102; and a second end 130, whose diameter is smaller than that of the cylindrical portion. In the locked position, the balls 110 rest on the cylindrical portion 128. The second end 130 of the rod extends into the body, between the radial openings and the terminal end 103 of the body.

The head 104 is bored through its entire length, from the bearing surface 106 to a rear surface 132 located opposite the bearing surface, so as to contain various portions of the rod 112. Thus, the diameter of the opening in the bearing surface 106 corresponds to the outside diameter of the body 102. The diameter of the opening in the rear surface 132 corresponds to the outside diameter of the first end 116 of the rod 112.

The connection between the opening diameters of the two surfaces consists of a shoulder 134. The space formed between the shoulder 134 and the enlarged portion 126 of the rod contains a compression spring 136. The spring tends to push the enlarged portion 126 of the rod away from the shoulder 134, so as to maintain the locked position.

The first end 116 of the rod includes an oblong slot that extends longitudinally along the axis of revolution (A). A transverse pin is positioned across the slot 138 and the head 104, in order to block any rotational movement of the lever 114 in relation to the head 104. The slot 138 and the transverse pin 140 together form means that prevent rotation of the lever 114 in relation to the head 104. The length of the oblong slot 138 is selected in accordance with the length of the second end 130 of the rod 112, and in accordance with the travel of the spring. The transverse pin 140 can slide inside the slot 138, between a locked position, in which the pin 140 is in abutment against a wall of the slot 138 that faces the end 116, and a released position, in which the pin 140 is in abutment against a wall of the slot 138 that faces the second end 130. The pin 140 extends in a plane that includes the axis of revolution (A).

The parallel walls 120, 122 of the lever are identical, and each of them has a cam surface 142 that is constantly in contact with the rear surface 132 of the head 104. The cam surface is capable of varying the distance between the pin 118 and the rear surface 132, as measured along the axis of revolution (A), between a minimal distance (Xmin), shown in FIG. 3, which corresponds to the locked position of the fastener, and a maximum distance (Xmax), shown in FIG. 4, which corresponds to the released position of the fastener. In the locked position, the pin 118 is closest to the rear surface 132, such that the rod 112 is pushed to its maximum extent into the body 102. In the released position, the pin 118 is farthest from the rear surface 132, such that the rod 112 is drawn to its maximum extent outward from the body 102.

FIG. 4 illustrates the ball pin in the released position. In this position, the handling area 123 is in contact with the handle 124. The pin 118 is positioned as far as possible from the rear surface 132 and the rod 112 is drawn toward the rear surface 132, leaving a space 144 in the head 104 between the enlarged portion 126 and the end of the body 102 that is inserted into the front surface 106. The space 144 corresponds to the compression stroke of the spring 136. Here the transverse pin 140 is in abutment against the wall of the slot 138 that faces the second end 130 of the rod. The second end 130 of the rod 112 is offset, from the terminal end 103 of the body and toward the rear surface 132, by a distance equivalent to the compression stroke of the spring, so as to be located opposite the openings 108 in the body. The balls 110 then rest on the second end 130 of the rod, and do not protrude beyond the body.

To install the ball pin 100, an operator grasps the fastener by the portions of the lever 114 and the handle 124 that are in contact with each other, and then inserts the body 102 into a bore previously formed in a structure until the front surface 106 comes into contact with the structure and the end 103 of the body exits from the other side of the structure. To lock the fastener 100, the operator releases the finger pressure that was previously applied to the lever 114. As a result of the action of the compression spring 136, which pushes the enlarged portion 126 toward the structure when it is released, the pin 118 is drawn toward the rear surface 132 of the head, thereby causing the lever 114 to pivot about the transverse pin 118. The balls 110 are pushed toward the outside of the body when the rod 112 is drawn through the body, so as to block any movement of the pin 100. The operator can then release the handle 124.

To remove the ball pin 100, an operator grasps the fastener by the handling area 123 of the lever 114 and by the handle 124. The finger pressure on the handling portion 123 is sufficient to compress the spring 136 and to cause the lever to pivot about the pin 118 and bring the lever into contact with the handle 124. The rotation of the cam surfaces of the lever draws the rod 112 toward the rear surface 132, thereby releasing the balls 110. The operator can then extract the fastener 100 with one hand.

Thus, such a fastener is easy to handle, because it requires the use of only one hand. This fastener also has the advantage of having a body whose terminal end is extremely compact, because only the second end 130 of the rod needs to be seated between the radial openings 108 and the terminal end of the body. Consequently, the fastener can be used in a structure that itself is located in a confined space. Last, the faster can be released with just one application of pressure to the lever 123.

In a known manner, the lever may include, at the end of the handling area 123, a ring 146 to which is attached a visual indicator 148 of the presence of a ball pin 100 installed in the structure.

The invention claimed is:

1. Quick-release fastener consisting of a tubular body having an axis of revolution (A), a portion of which includes at least one radial opening; an enlarged head having a bearing surface configured to contact a structure and wherein the head includes a handle fixed to and extending laterally of the head; and a rod that can move axially within the body and through the head, which rod includes at least one portion having a reduced cross-section; at least one ball capable of moving radially between a released position in which it rests in the reduced cross-section of the rod inside the body and a locked position in which it protrudes radially beyond the body through the radial opening; and a lever that pivots about a pin that is an integral part of the rod and of the lever, which lever includes at least one cam surface that is in contact with the head; which fastener is configured such that the rotation of the lever causes the rod to be drawn toward the head, thereby causing the ball to move into the released position.

2. Fastener according to claim 1 in which the rod includes anti-rotation means that lock the rotation of the lever in relation to the head.

3. Fastener according to claim 2, in which the anti-rotation means consist of an oblong slot formed in the rod and a transverse pin that passes through both the head and the slot.

4. Fastener according to claim 1, in which the lever is in contact with the handle in the released position.

5. Fastener according to claim 1, in which the head includes a rear surface located opposite the bearing surface, with the head being bored longitudinally from the bearing surface to the rear surface.

6. Fastener according to claim 5, in which the cam surface rests against the rear surface.

7. Fastener according to claim 5, in which a compression spring is housed inside the bore of the head.

8. Fastener of claim 1 wherein the handle extends perpendicular to the axis of revolution.

9. Fastener of claim 1 wherein the handle extends in a plane spaced from a plane containing the bearing surface.

* * * * *